(12) United States Patent  
Stone et al.

(10) Patent No.: US 8,942,722 B2  
(45) Date of Patent: Jan. 27, 2015

(54) INTEGRATION OF WIRED INFORMATION AND WIRELESS INFORMATION TO LOCATE A WIRELESS DEVICE

(75) Inventors: David Stone, Irvine, CA (US); Eric W. Sybesma, Minneapolis, MN (US); Kevin Ressler, Mechanicsburg, PA (US)

(73) Assignee: ADC Telecommunications, Inc., Shakopee, MN (US)

( * ) Notice: Subject to any disclaimer, the term of this patent is extended or adjusted under 35 U.S.C. 154(b) by 306 days.

(21) Appl. No.: 13/492,283

(22) Filed: Jun. 8, 2012

(65) Prior Publication Data

US 2012/0315921 A1    Dec. 13, 2012

Related U.S. Application Data

(60) Provisional application No. 61/495,245, filed on Jun. 9, 2011.

(51) Int. Cl.
| | | |
|---|---|---|
| *H04W 24/00* | (2009.01) | |
| *H04M 11/00* | (2006.01) | |
| *H04W 72/00* | (2009.01) | |
| *H04M 1/66* | (2006.01) | |
| *H04W 4/00* | (2009.01) | |
| *H04M 11/04* | (2006.01) | |
| *H04L 12/66* | (2006.01) | |
| *H04L 12/28* | (2006.01) | |
| *G01R 31/08* | (2006.01) | |
| *H04W 4/02* | (2009.01) | |
| *H04L 29/08* | (2006.01) | |

(52) U.S. Cl.
CPC ........ *H04W 4/02* (2013.01); *H04L 67/18* (2013.01)
USPC ..... 455/456.1; 455/406; 455/411; 455/426.1; 455/450; 455/404.2; 455/414.2; 370/328; 370/338; 370/352; 370/401

(58) Field of Classification Search
USPC ............... 455/406, 450, 456.1, 411, 426.1; 370/328, 338, 352, 401; 725/25, 33, 725/88, 111, 132
See application file for complete search history.

(56) References Cited

U.S. PATENT DOCUMENTS

| | | | |
|---|---|---|---|
| 5,910,776 | A | 6/1999 | Black |
| 2006/0133332 | A1* | 6/2006 | Achanta .................... 370/338 |
| 2007/0184851 | A1* | 8/2007 | Barnwell et al. .......... 455/456.1 |
| 2008/0080415 | A1* | 4/2008 | Stephenson et al. ......... 370/328 |
| 2008/0311931 | A1 | 12/2008 | Venkatachalam et al. |
| 2009/0247120 | A1* | 10/2009 | Heutschi et al. ............. 455/406 |
| 2010/0211652 | A1* | 8/2010 | Hong ........................... 709/217 |

(Continued)

OTHER PUBLICATIONS

The International Bureau of WIPO, "International Preliminary Report on Patentability", "from PCT Counterpart of U.S. Application No. ", Dec. 27, 2013, pp. 1-6, Published in: CH.

(Continued)

*Primary Examiner* — Inder Mehra
(74) *Attorney, Agent, or Firm* — Fogg & Powers LLC

(57) ABSTRACT

One embodiment described herein includes a method of determining the location of a wireless device. The method includes capturing wired information about layer one and layer two used by wired components in a network; capturing wireless information about a wireless device communicatively coupled to the network; integrating at least some of the wired information and the wireless information; and using the integrated wired information and wireless information to locate the wireless device.

27 Claims, 2 Drawing Sheets

(56) References Cited

U.S. PATENT DOCUMENTS

| | | |
|---|---|---|
| 2011/0092100 A1 | 4/2011 | Coffey |
| 2011/0115494 A1 | 5/2011 | Taylor |
| 2011/0116748 A1 | 5/2011 | Smrha |
| 2011/0222819 A1 | 9/2011 | Anderson et al. |
| 2011/0228473 A1 | 9/2011 | Anderson et al. |
| 2011/0235979 A1 | 9/2011 | Anderson et al. |
| 2011/0255829 A1 | 10/2011 | Anderson et al. |
| 2011/0262077 A1 | 10/2011 | Anderson et al. |
| 2011/0267794 A1 | 11/2011 | Anderson et al. |
| 2012/0113613 A1 | 5/2012 | Anderson et al. |
| 2012/0133524 A1 | 5/2012 | Anderson et al. |
| 2012/0164877 A1* | 6/2012 | Wallace et al. ............... 439/535 |

OTHER PUBLICATIONS

International Searching Authority, "International Search Report", "from Foreign Counterpart of U.S. Appl. No. 13/492,283", Dec. 26, 2012, pp. 1-9, Published in: WO.

* cited by examiner

US 8,942,722 B2

INTEGRATION OF WIRED INFORMATION AND WIRELESS INFORMATION TO LOCATE A WIRELESS DEVICE

CROSS-REFERENCE TO RELATED APPLICATIONS

This application claims the benefit of U.S. Provisional Patent Application Ser. No. 61/495,245, filed on Jun. 9, 2011, which is hereby incorporated herein by reference.

BACKGROUND

Technology for tracking physical layer information (among other information) relating to wired communication media, components, devices, systems, and/or networks is described in the following United States Patent Applications, all of which are hereby incorporated herein by reference: United States Patent Publication 2011/0115494 published on May 19, 2011, titled "ELECTRICAL PLUG FOR MANAGED CONNECTIVITY SYSTEMS"; United States Patent Publication 2011/0115494 published on May 19, 2011, titled "MANAGED ELECTRICAL CONNECTIVITY SYSTEMS"; United States Patent Publication No. 2011/0115494 published on May 19, 2011, titled "MANAGED ELECTRICAL CONNECTIVITY SYSTEMS"; United States Patent Publication No. 2011/0228473 published on Sep. 22, 2011, titled "COMMUNICATIONS BLADED PANEL SYSTEMS"; United States Patent Publication No. 2012/0133524 published on May 31, 2012, titled "COMMUNICATIONS BLADED PANEL SYSTEMS"; United States Patent Publication No. 2012/0113613 published on May 10, 2012, titled "COMMUNICATIONS BLADED PANEL SYSTEMS"; United States Patent Publication No. 2011/0267794 published on Nov. 3, 2011, titled "COMMUNICATIONS BLADED PANEL SYSTEMS"; United States Patent Publication No. 2011/0222819 published on Sep. 15, 2011, titled "Managed Fiber Connectivity Systems"; United States Patent Publication No. 2011/0255829 published on Oct. 20, 2011, titled "Managed Fiber Connectivity Systems"; United States Patent Publication No. 2011/0235979 published on Sep. 29, 2011, titled "Managed Fiber Connectivity Systems"; U.S. Pat. No. 8,690,593 Issued on Apr. 8, 2014; titled "Managed Fiber Connectivity Systems"; United States Publication No. 2012/0234778 published on Sep. 20, 2012, titled "CABLE MANAGEMENT IN RACK SYSTEMS"; United States Patent Publication No. 2011/0092100 published on Apr. 21, 2011, titled "MANAGED CONNECTIVITY IN ELECTRICAL SYSTEMS"; U.S. Pat. No. 8,596,882 Issued on Dec. 13, 2013, titled "MANAGED CONNECTIVITY IN FIBER OPTIC SYSTEMS"; United States Publication No. 2012/0246347 published on Sep. 27, 2012, titled "SYSTEMS AND METHODS FOR UTILIZING VARIABLE LENGTH DATA FIELD STORAGE SCHEMES ON PHYSICAL COMMUNICATION MEDIA SEGMENTS"; United States Publication No. 2012/0246523 published on Sep. 27, 2012, titled "DYNAMICALLY DETECTING A DEFECTIVE CONNECTOR AT A PORT"; United States Publication No. 2012/0246362 published on Sep. 27, 2012, titled "DOUBLE-BUFFER INSERTION COUNT STORED IN A DEVICE ATTACHED TO A PHYSICAL LAYER MEDIUM"; and United States Publication No. 2012/0243554 published on Sep. 27, 2012, titled "EVENT-MONITORING IN A SYSTEM FOR AUTOMATICALLY OBTAINING AND MANAGING PHYSICAL LAYER INFORMATION USING A RELIABLE PACKET-BASED COMMUNICATION PROTOCOL".

The technology described in the applications noted in the previous paragraph makes use of an EEPROM or other storage device that is integrated with a connector on a cable, fiber, or other segment of communication media. The storage device is used to store information about the connector or segment of communication media along with other information. The EEPROM or other storage device can be read after the associated connected is inserted into a corresponding jack or other port. In this way, information about wired communication media, devices, systems, and/or networks can be captured in an automated manner.

Another type of technology for tracking information about the physical layer of a wired network (along with other information) is so-called "ninth wire" technology. Ninth wire technology makes use of special cables that include an extra conductor or signal path (also referred to here as the "ninth wire" conductor or signal path) that is used for determining which port each end of the cables is inserted into. One example of ninth wire technology is the AMPTRAC family of connectivity management products that are commercially available from TE Connectivity Ltd. Also, examples of ninth wire technology are described in the following United States Patent Applications, all of which are hereby incorporated herein by reference: U.S. Pat. No. 7,160,143, titled "SYSTEM FOR MONITORING CONNECTION PATTERN OF DATA PORTS", U.S. Pat. No. 6,961,675, titled "SYSTEM FOR MONITORING CONNECTION PATTERN OF DATA PORTS", U.S. Pat. No. 6,725,177, titled "SYSTEM FOR MONITORING CONNECTION PATTERN OF DATA PORTS", U.S. Pat. No. 6,684,179, titled "SYSTEM FOR MONITORING CONNECTION PATTERN OF DATA PORTS", and U.S. Pat. No. 6,574,586, titled "SYSTEM FOR MONITORING CONNECTION PATTERN OF DATA PORTS".

Another type of technology for tracking information about the physical layer of a wired network (along with other information) makes use of RFID tags and readers. With this type of technology, an RFID tag is attached to or integrated with a connector on a cable, fiber, or other segment of communication media. The RFID tag is used to store information about the connector or segment of communication media along with other information. The RFID tag can be read after the associated connected is inserted into a corresponding jack or other port using a RFID reader. In this way, information about wired communication media, devices, systems, and/or networks can be captured in an automated and contactless manner. One example of such RFID technology is described in U.S. Pat. No. 6,002,331, titled "METHOD AND APPARATUS FOR IDENTIFYING AND TRACKING CONNECTIONS OF COMMUNICATION LINES", which is incorporated herein by reference.

SUMMARY

One embodiment includes a method of determining the location of a wireless device. The method includes capturing wired information about layer one and layer two used by wired components in a network; capturing wireless information about a wireless device communicatively coupled to the network; integrating at least some of the wired information and the wireless information; and using the integrated wired information and wireless information to locate the wireless device.

DETAILED DESCRIPTION

In some applications, it is desirable to integrate information relating to wireless components, devices, systems, and/or networks with information obtained using wired connectivity management technology (such as the storage-device connectivity management technology mentioned above in paragraphs [0002]-[0003], the ninth-wire connectivity management technology mentioned above in paragraph [0004], and the RFID technology described in paragraph [0005]).

One application is where such integration is performed in order to locate wireless devices. One example of such an application is illustrated in FIG. 1.

Figure 1:
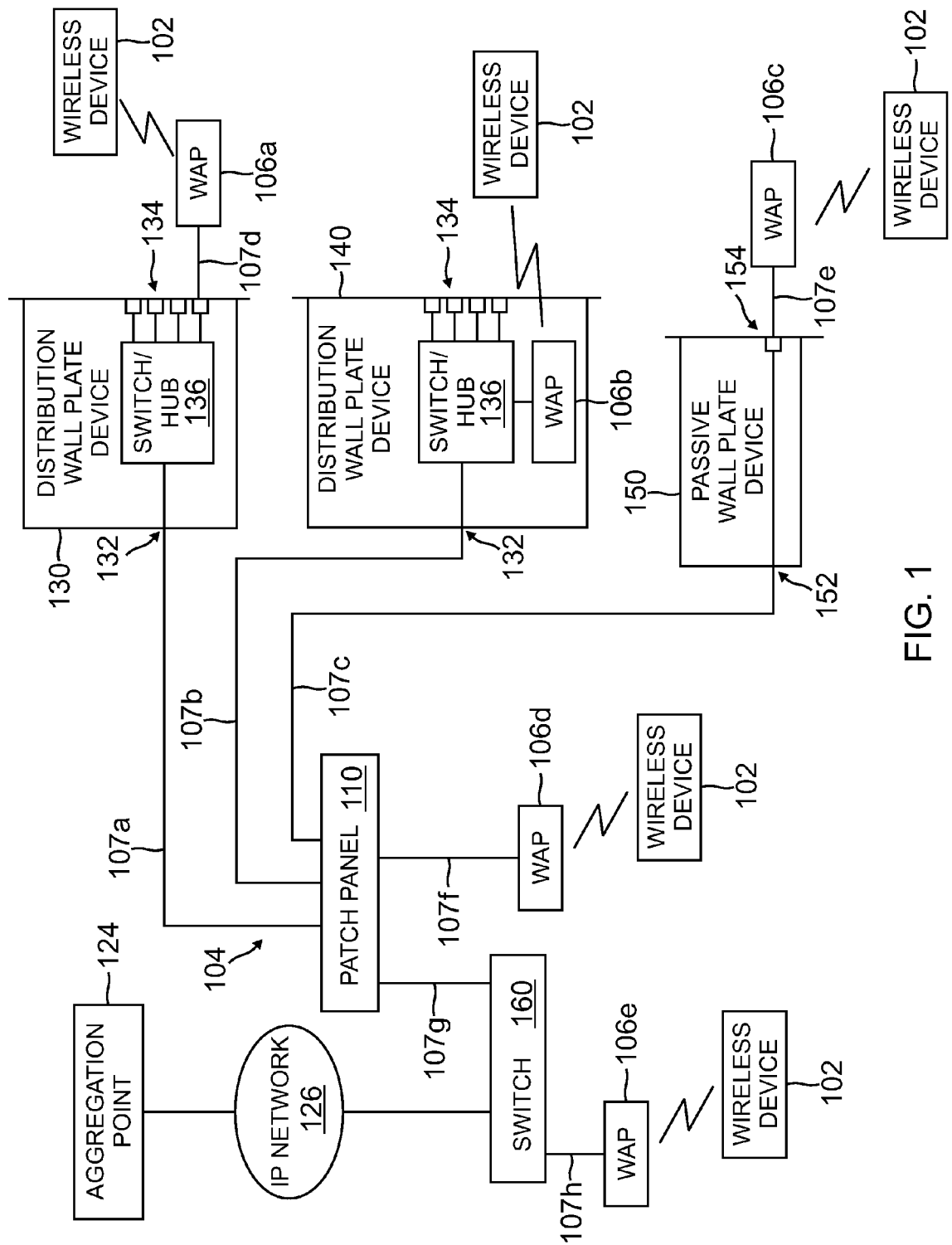
FIG. 1 is a block diagram of an example network including an aggregation point configured to integrate wired information and wireless information about the network.

In FIG. 1, various wireless devices 102 are located throughout a single building or a campus of buildings. Each wireless device 102 wirelessly connects to a local area network 104 via a wireless access point 106. In this particular example, the wireless devices 102 and the wireless access points 106 implement one or more of the Institute of Electrical and Electronics Engineers (IEEE) 802.11 family of wireless local area networking standards. It is to be understood that other wireless networking technology can be used including, without limitation, wireless personal area networking technology such as the BLUETOOTH or IEEE 802.15 (ZIGBEE) family of standards, wireless wide area networking technology such as the IEEE 802.16 (WIMAX) family of standards, and cellular networking technology.

In the example shown in FIG. 1, the local area network 104 is implemented using the storage-device connectivity management technology described above. A patch panel 110 is used to cross connect various parts of the local area network 104. Devices within the network 104 are coupled together with wired communication media 107. The example wired communication media 107 shown in FIG. 1 is described here as copper twisted-pair cabling (for example, CAT-5 or CAT-6 cabling), though other types of wired communication media can be used (for example, fiber optic cables).

The patch panel 110 comprises a set of ports (not shown). Each port is associated with a respective jack on the front face of the patch panel 110 into which a RJ-45 connector of a communication media 107 can be inserted. Each port is also associated with a respective rear termination point at which a horizontal run of a communication media 107 can be terminated. Each port is configured to communicatively couple the jack associated with that port (and any communication media 107 inserted therein) to the respective termination point (and any horizontal run of communication media 107 terminated thereat). In this way, a patch cord inserted into the front jack of the port can be connected to the corresponding horizontal run of twisted-pair cabling terminated at the corresponding rear termination point.

In the example shown in FIG. 1, each horizontal run terminates at its other end at a wall plate device. Several types of wall plate devices are shown in FIG. 1.

One type of wall plate device shown in FIG. 1 is a distribution wall plate device 130. The distribution wall plate device 130 is coupled to the patch panel 110 with the communication media 107a (e.g., a CAT-5 or CAT-6 cable). The distribution wall plate device 130 includes a termination point 132 at which a horizontal run of the communication media 107a can be terminated. A first connector of the communication media 107a is connected to a first jack of the patch panel 110 and a second end of the communication media 107a is connected to the termination point of the distribution wall plate device 130.

The distribution wall plate device 130 also includes a plurality of jacks 134 (for example, RJ-45 jacks) and an ETHERNET hub or switch 136. The termination point 132 for the horizontal run and each of the jacks 134 are coupled to a respective port of the ETHERNET hub or switch 136. In this way, each of the jacks 134 is communicatively coupled to the horizontal run terminated at the termination point 132, and the connectivity provided over the horizontal run can be shared by devices connected to the jacks 134. The distribution wall plate device 130 also includes a suitable power supply or interface (not shown) for providing power to the ETHERNET hub or switch 136. Examples of ways of providing power to the ETHERNET hub or switch 136 include using Power-Over-ETHERNET technology to provide power over the horizontal run of the communication media 107a and/or over one or more communication mediums 107d connected to the jacks 134. Power can also be provided by connecting the distribution wall plate device 130 to a conventional AC mains power outlet using an external or internal power adapter.

In the example shown in FIG. 1, a wireless access point 106a is connected to the local area network 104 by connecting one end of a communication media 107d (e.g., a CAT-5 or CAT-6 cable) to the wireless access point 106a and the other end of the communication media 107d to one of the jacks 134 of the distribution wall plate device 130.

Another type of wall plate device shown in FIG. 1 is a distribution wall plate device 140 with an integrated wireless access point 106b. The distribution wall plate device 140 is coupled to the patch panel 110 with a communication media 107b (e.g., a CAT-5 or CAT-6 cable). A first connector at a first end of the communication media 107b is connected to a second jack of the patch panel 110 and a second end of the communication media 107b is connected to a termination point 132 of the distribution wall plate device 140. The termination point 132 is a point at which a horizontal run of the communication media 107b is terminated.

This type of distribution wall plate device 140 is the same as the distribution wall plate device 130 described above except that the distribution wall plate device 140 additionally includes an integrated wireless access point 106b. The integrated wireless access point 106b is packaged and housed with the other components of the distribution wall plate device 140. The integrated wireless access point 106b is coupled to a respective port of the ETHERNET hub or switch 136 that is included in the distribution wall plate device 140. In this way, connectivity is provided to the integrated wireless access point 106b. Power can be provided to the integrated wireless access point device 106b in the same manner as power is provided to the other active components of the distribution wall plate device 140.

Another type of wall plate device shown in FIG. 1 is a conventional passive wall plate device 150. The passive wall plate device 150 includes a termination point 152 for a horizontal run of the communication media 107c and a corresponding jack 154. The passive wall plate device 150 is coupled to the patch panel 110 with the communication media 107c (e.g., a CAT-5 or CAT-6 cable). A first connector at a first end of the communication media 107c is connected to a first jack of the patch panel 110 and a second end of the communication media 107c is connected to a termination point 132 of the passive wall plate device 150. Each conductor in the horizontal run of twisted-pair cabling (107c) is electrically connected to a corresponding conductor in the jack 154. In this way, the jack 154 is communicatively coupled to the horizontal run terminated at the termination point 152, and the connectivity provided over the horizontal run can be shared by any devices connected to the jack 154.

In the example shown in FIG. 1, a wireless access point 106*c* is connected to the local area network 104 by connecting one end of a communication media 107*e* (e.g., a CAT-5 or CAT-6 cable) to the wireless access point 106*c* and the other end of the communication media 107*e* to the jack 154 of the passive wall plate device 150.

In the example shown in FIG. 1, a wireless access point 106*d* is connected to the local area network 104 by connecting one end of a communication media 107*f* (e.g., a CAT-5 or CAT-6 cable) to the wireless access point 106*d* and the other end of the communication media 107*f* to one of the front jacks of the patch panel 110 (for example, where the wireless access point 106*d* is located in the same location as the patch panel 110).

In the example shown in FIG. 1, the local area network 104 also includes a switch 160 (or other internetworking device such as a hub, bridge, router, or gateway). Various ports of the patch panel 110 can be connected to ports of the switch 160 by connecting one or more communication mediums 107*g* between the front jacks of the patch panel 110 and jacks of the switch 160.

In the example shown in FIG. 1, a wireless access point 106*e* is connected to the local area network 104 by connecting one end of a communication media 107*h* (e.g., a CAT-5 or CAT-6 cable) to the wireless access point 106*e* and the other end of the communication media 107*h* to one of the jacks of the switch 160.

In the example shown in FIG. 1, each of the jacks of the patch panel 110 are configured to be able to read a storage device associated with a connector of a communication media 107 inserted into that jack as described in the patent applications listed in paragraph [0001]. The information read from the storage device includes wired information about the connector and/or the communication media 107 of which it is part, identifying information, as well as other information. This information is communicated from a processor associated with the patch panel 110 to an aggregation point 124.

Other devices in the network can also read information from storage devices associated with a connector of a communication media 107. For example, as described in one or more of the patent applications noted in paragraph [0002], one or more of the switch 160, wall plate devices, switch/hub 136, and any end devices (including wireless access points 106 and computers (not shown)) can include functionality for reading a storage device integrated into a connector of a communication media 107 that is inserted into a jack (or other port) included in that device. Such devices would also include functionality for communicating the information read from such storage devices, as well as information about the reading devices, to an aggregation point as described in one or more of the patent applications noted in paragraph [0002]. For example, the connector can include a chip integrated into the connector, wherein the chip and the connector are configured such that the chip is electrically connected to corresponding conductors on a corresponding jack when the connector is inserted into said jack.

The network devices can also include functionality for reading information from a storage device that is connected to a radiating component with a device on a corresponding jack. For example, a chip including the storage device can be integrated into the connector and coupled to the radiating component. This includes, for example, using RFID technology to wirelessly read the information from the storage device associated with the connector as described in the patent applications noted in paragraph [0005].

In yet another example, the network devices can include functionality for sending information over an out-of-band conductor included in the wired communication media 107 in addition to in-band conductors, as described in the patent applications noted in paragraph [0004]. Information obtained from the information sent over the out-of-band conductor can be provided to the aggregation point 124 as wired information. The information obtained form the information sent over the out-of-band conductor can be used to identify which port (e.g., of switch 160, switch/hub 136, or patch panel 110) is communicating with which device in the network 104.

The switch 160 or switch/hub 136 can similarly be configured to read a storage device associated with a connector of the communication media 107*d* between the switch 160 and the wireless access point 106*a*.

The information read from the storage device of a communication media 107 includes wired information about the connector and/or the communication media 107*d* of which it is part, identifying information (e.g., to uniquely identify the communication media 107), as well as other information. This information is communicated from a processor associated with the switch 160 to the aggregation point 124.

The aggregation point 124 is coupled to the processors associated with the devices (e.g., patch panel 110) in the network 104 over an IP network 126 (for example, an IP network of which the local area network 104 is a part). The aggregation point 124 is implemented as middleware software executing on one or more servers (or other computers). The aggregation point 124 aggregates information from various entities within the local area network 104 (and the IP network 126 more generally). The information that is aggregated by the aggregation point 124 includes information on wired components (also referred to herein as "wired information") and information on wireless components (also referred to herein as "wireless information") associated with the network 104.

Figure 2:
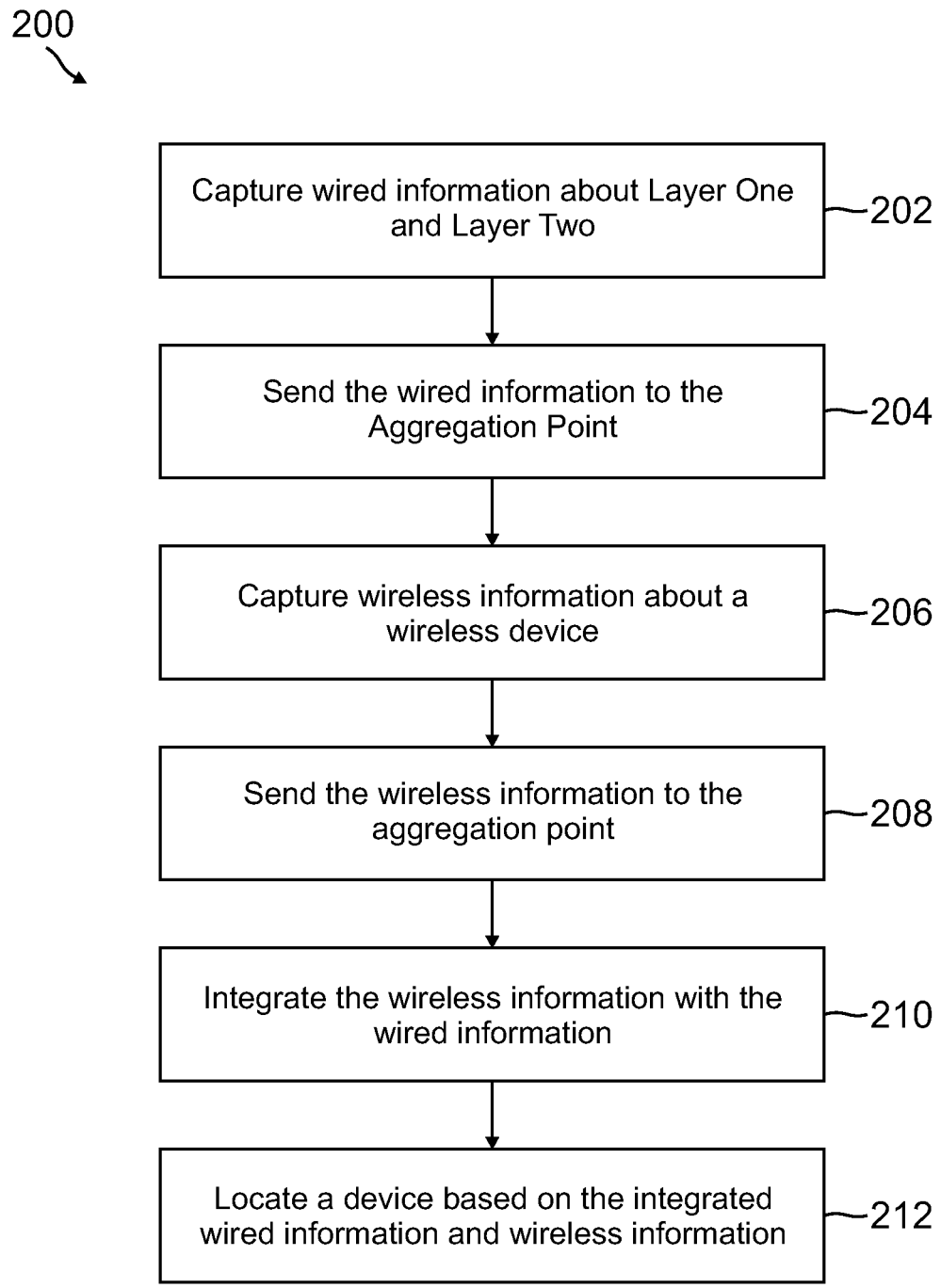
FIG. 2 is a flow diagram of an example method for locating a wireless device using wired information integrated with wireless information about the network.

FIG. 2 is an example block diagram of a method 200 of locating a device using the integrated wired and wireless information. The aggregation point 124 can be configured to perform method 200 to locate the device (e.g., a wireless device 102 or a wireless access point 106).

At block 202, wired information about layer one and layer two in the network 104 is captured. Wired information includes information about the layer one and/or layer two (that is, the lowest and second lowest layers of the network communication systems (e.g., the physical layer and datalink layer)) used by devices in the network 104. For example, wired information can include information obtained from a storage device associated with a connector of a communication media 107 as discussed above. This wired information can include information that is automatically captured by entities that include functionality for reading storage devices that are associated with connectors (for example, as described above in connection with the patch panel 110). The wired information can include information about the identity, type, and length of cable used, information about the identity and type of connector used, and information that associates each such connector (and/or cable) with a respective jack, port, or other attachment point of the relevant entity. Wired information can also include information about how each device (e.g., wireless access point 106) is physically connected to other devices in the local area network 104. This wired information can be captured by any of the devices in the network 104 connected to a wired communication media 107. At block 204, the wired information is sent to the aggregation point 124 over the IP network 126.

At block 206, wireless information is captured. Wireless information includes information about the wireless access points 106 and the wireless devices 102 that are wirelessly coupled to the wireless access points 106. For example, information identifying the wireless access point 106 or wireless devices 102 that are currently connected to each wireless access point 106 can be retrieved from each wireless access point 106. In an example, the information identifying the wireless access point 106 or wireless devices 102 includes a serial number and/or MAC address. The wireless information can also includes type and capabilities (for example, transmit power and/or coverage area) of a wireless access point 106 and/or wireless device 102. The wireless information can be captured by the wireless access points 106 and/or the wireless devices 102. At block 208, the wireless information is sent to the aggregation point 124 over the IP network 126.

Some or all of the wired information and wireless information can be manually entered. Examples of such manually entered information include wired information such as information about the horizontal runs (including information about the identity, type, length, and location of cabling used), information about the wall plate devices that terminate the various horizontal runs (including information about the identity, type, location, and capabilities of the wall plate device), information about the switch 160 (including information about the identity, type, location, and capabilities of the switch 160), information about the switch/hub 136, and information that associates each such connector (and/or cable) with a respective jack, port, or other attachment point of the relevant entity. Other types of information that can be aggregated by the aggregation point 124 are described in the patent applications listed in paragraph [0002].

At block 210, the aggregation point 124 integrates the wired information and the wireless information. Information about the wired communication media, components, devices, and systems, and/or networks used in the local area network 104 (or the IP network 126 of which the local area network 104 is a part) including the information about layer one and layer two can be integrated with information about wireless components, devices, systems and/or networks. For example, information about the wireless access points 106 and the wireless devices 102 that are wirelessly connected to the wireless access points 106 can be associated with information about the wired communication media, components, devices, and systems, and/or networks used in the local area network 104 (or the IP network 126 of which the local area network 104 is a part) in order to assist in locating one or more of the wireless access points 106 and/or the wireless devices 102 wirelessly connected to the wireless access points 106.

Integrating the wired and wireless information can include associating various entities within the network 104 with other entities within the network 104. Entities within the network 104 can be associated with one another based on the wired and wireless information that is provided to the aggregation point 124. The associations identified can lower-level (e.g., layer one (physical layer) and layer two (datalink layer)) associations (e.g., direct communications) between entities within the network 104 identified by the wired information. These entity-to-entity lower-level associations can be combined to construct a set of associations that identify a physical communication path through the entities for which the aggregation point 124 has information. For example, the layer two information can include LAYER 2 forwarding information maintained by each switch 160 (which includes, among other things, information about which switch port provides a logical communication path to each wireless device 102 and/or wireless access point 106 and information about which MAC addresses are associated with each switch ports) can be retrieved from the switch 160. This information can be used to associate a particular port of the switch 160 with a wireless device 102 or wireless access point 106.

At block 212, the aggregation point 124 can use the integrated information to locate a wireless device 102 or wireless access point 106. The integrated wired and wireless information can start with a MAC address of a wireless device 102 and determine the MAC address of the wireless access point 106 that that wireless device 102 is wirelessly connected to. Then, the wired information can be used to determine which wall plate device (e.g., switch/hub 136) or other wired entity (for example, patch panel 110 or switch 160) that the identified wireless access point 106 is connected to via a communication media 107. The location of the wall plate or other entity the identified wireless access point 106 is connected to can then be determined from the aggregated wired information and the length of any cable used to connect the identified wireless access point 106 to the wall plate device or other entity. Also, information about the transmit power or coverage area of the identified wireless access point 106 can further be used to determine (e.g., narrow) the area in which the wireless device 102 might be located.

In another example of block 212, the port of the switch 160 or patch panel 110 that provides the logical communication path for a wireless device 102 or a wireless access point 106 is identified by the aggregation point 124. The aggregation point 124 can then identify the entity within the network 104 that is coupled to this particular port of the switch 160. For example, the wired information obtained by the aggregation point 124 can be used to identify which entity is connected to the opposite end of the communication media 107 that is connected to the particular port of the switch 160 or patch panel 110. With this information, a first lower-level association of the physical communication path of the wireless device 102 or wireless access point 106 has been identified. Remaining portions of the physical communication path of the wireless device 102 or wireless access point 106 can be identified in a similar manner based on the connections of other communication media 107 with the entity identified in the first link of the physical communication path. Once all or a portion of the physical communication path from the particular port of the switch 160 or patch panel 110 has been identified, the one or more entities that are in the physical communication path are known. A location of these one or more entities in the physical communication path can be used to determine a location of the wireless device 102 or wireless access point 106. For example, to determine a location of a wireless device 102, the location of a wireless access point 106 at the end of the physical communication path in which the wireless device 102 is communicating can be identified from manually entered data. The location of the wireless access point 106 can then be used, along with other information, to determine the location of the wireless device 102. For example, information about the transmit power or coverage area of the identified wireless access point 106 can further be used to determine (e.g., narrow) the area in which the wireless device 102 might be located. In another example, the wall plate or other entity in the physical communication path of the particular port and the length of any cable used to connect the identified wireless access point 106 to the wall plate device or other entity can be used to determine a location for the identified wireless access point 106.

One application where such location techniques can be used is in providing E911 service for a wireless voice-over-internet-protocol (VOIP) phone. Another application where such location techniques can be used is in locating high value wireless medical equipment. Another application where such location techniques can be used is in asset tracking.

Although the example shown in FIG. 1 was described above as being implemented using storage-device connectivity-management technology it is to be understood that ninth-wire connectivity management technology can be used in addition or instead of storage-device connectivity-management technology.

Moreover, although the example shown in FIG. 1 was described above as being implemented with wireless local area networking technology, it is to be understood that the integration strategies described here can be used with other types of wireless technology such wireless personal area networking technology and wireless wide area networking technology as well as with cellular wireless technology.

Furthermore, various media conversion technology can be used (for example, in one or more of the wall plate devices, where the wall plate devices are fed with fiber horizontal runs and provide one or more copper jacks).

Wireless devices 102 can include any device capable of communicating wirelessly with a wireless access point 102. For example, wireless devices 102 can include a mobile voice-over IP (VOIP) phone, tablet, laptop (including a netbook), PDA, wireless medical device, or other device.

A number of embodiments have been described. Nevertheless, it will be understood that various modifications to the described embodiments may be made without departing from the spirit and scope of the claimed invention.

The invention claimed is:

1. A method of determining the location of a wireless device, the method comprising:
   capturing wired information about layer one and layer two used by wired components in a network, wherein capturing wired information includes one or more of:
      reading information from a storage device associated with a connector of a wired communication media, wherein reading information from a storage device associated with a connector includes reading information from a chip integrated in the connector, wherein the chip is electrically connected to corresponding conductors on a corresponding jack; and
      communicating a signal over an out-of-band conductor included in a cable in addition to the in-band conductors;
   capturing wireless information about a wireless device communicatively coupled to the network;
   integrating at least some of the wired information and the wireless information; and
   using the integrated wired information and wireless information to locate the wireless device.

2. The method of claim 1, wherein reading information from a storage device associated with a connector includes reading information from a chip connected to a radiating component with a device on a corresponding jack.

3. The method of claim 1, wherein capturing wireless information includes capturing information that identifies the wireless device.

4. The method of claim 3, wherein capturing information that identifies the wireless device includes capturing a MAC address of the wireless device.

5. The method of claim 1, comprising:
   identifying physical layer connections between devices in the network based on the wired information.

6. The method of claim 1, wherein using the integrated wired information and wireless information to locate the wireless device includes determining a location of a wireless access point with which the wireless device is communicating and using the location of the wireless access point to determine the location of the wireless device.

7. The method of claim 6, comprising:
   identifying a port of a switch or patch panel that provides a logical communication path to the wireless device; and
   identifying a lower-level association from the port to another device.

8. The method of claim 7, wherein determining a location of a wireless access point includes identifying a physical communication path from the port of the switch or patch panel to identify the wireless access point associated with the port.

9. The method of claim 1, wherein the wireless device comprises at least one of a wireless VOIP phone and a piece of wireless medical equipment.

10. The method of claim 1, wherein information about a wall plate device having an integrated wireless access point is captured.

11. The method of claim 10, wherein the integrated wireless access point has a relatively low power.

12. The method of claim 1, wherein the wireless information includes information about the transmit power or coverage area of a wireless access point.

13. The method of claim 1, wherein the wired information includes information about the location of wall plate device to which a wireless access point is connected.

14. The method of claim 1, wherein the wired information includes information about the location of wall plate device in which a wireless access point is integrated.

15. The method of claim 1, wherein the wired information includes information about the length of a cable used to connect a wireless access point to a wall plate device or other wired entity.

16. The method of claim 1, wherein the wireless information includes information about which wireless devices are connected to a particular wireless access point that is retrieved from the wireless access point.

17. The method of claim 1, wherein the wired information includes LAYER 2 port forwarding information obtained from a switch.

18. The method of claim 1, wherein the out-of-band conductor is a "ninth wire" conductor or signal path and the in-band conductors are a "normal" signal path.

19. The method of claim 18, wherein the wireless access point is configured to communicate the information about the connection of the wireless access point to the wired network to an aggregation point.

20. A network system comprising:
   a plurality of network devices including at least one wireless access point coupled to an aggregation point through a patch panel;
   a plurality of wired communication mediums coupling the plurality of network devices together, wherein at least some of the plurality of wired communication mediums include one of a storage device associated with a connector, the storage device having identifying information stored therein or an out-of-band conductor for out-of-band signaling in addition to in-band conductors;
   wherein one or more of the plurality of network devices are configured to capture wired information about layer one and layer two used by wired components in a network, wherein capture wired information includes one or more of:

read information from the storage device associated with a connector of a wired communication media, wherein read information from the storage device associated with a connector includes read information from a chip integrated in the connector, wherein the connector includes conductors to electrically couple the chip to conductors on a corresponding jack; and communicate a signal over the out-of-band conductor;

wherein one or more of the plurality of network devices are configured to capture wireless information about a wireless device communicatively coupled to the at least one wireless access point; and wherein the aggregation point is configured to integrate at least some of the wired information and the wireless information and use the integrated wired information and wireless information to locate the wireless device.

21. The network system of claim 20, wherein read information from the storage device associated with a connector includes read information from a chip connected to a radiating component with a device on a corresponding jack.

22. The network system of claim 20, wherein capture wireless information includes capturing information that identifies the wireless device.

23. The network system of claim 20, wherein the aggregation point is configured to identify physical layer connections between devices in the network based on the wired information.

24. The network system of claim 20, wherein using the integrated wired information and wireless information to locate a wireless device includes determining a location of the at least one wireless access point with which the wireless device is communicating and using the location of the wireless access point to determine the location of the wireless device.

25. The network system of claim 24, wherein the aggregation point is configured to:

identify a port of a switch or patch panel that provides a logical communication path to the wireless device; and identify a lower-level association from the port to another device.

26. The network system of claim 25, wherein determine a location of the at least one wireless access point includes identifying a physical communication path from the port of the switch or patch panel to identify the at least one wireless access point associated with the port.

27. A method of determining a location of a wireless device, the method comprising:

capturing wired information about physical layer connections of devices in a network by doing at least one of: reading such information from a storage device associated with a connector of a wired communication media or communicating a signal over an out-of-band conductor included in a cable in addition to the in-band conductors, wherein reading such information from a storage device associated with a connector includes:

reading information from a chip integrated in the connector, wherein the chip is electrically connected to corresponding conductors on a corresponding jack; or reading information from a chip connected to a radiating component with a device on a corresponding jack;

capturing wireless information about a wireless device communicatively coupled to the network;

integrating the wired information and the wireless information;

identifying physical layer connections in a physical communication path between the wireless device and a patch panel;

determining a location of the wireless access point with which the wireless device is communicating based on the physical communication path between the wireless device and the patch panel; and using the location of the wireless access point to determine the location of the wireless device.

* * * * *